United States Patent

Rubner et al.

Patent Number: 5,565,722
Date of Patent: Oct. 15, 1996

[54] MAGNETIC BEARING CONTROL SYSTEM

[75] Inventors: Wolfgang Rubner, Herzogenrath; Bernd Lindenau, Julich, both of Germany

[73] Assignee: Forschungszentrum Julich GmbH, Julich, Germany

[21] Appl. No.: 338,554
[22] PCT Filed: May 19, 1993
[86] PCT No.: PCT/DE93/00451
§ 371 Date: Nov. 21, 1994
§ 102(e) Date: Nov. 21, 1994
[87] PCT Pub. No.: WO93/23683
PCT Pub. Date: Nov. 25, 1993

[30] Foreign Application Priority Data

May 19, 1992 [DE] Germany ............... 42 16 481.8

[51] Int. Cl.⁶ .................. G05D 23/275; G05D 1/02; H02K 7/09
[52] U.S. Cl. .................. 310/905; 318/607; 318/632
[58] Field of Search ............... 310/90.5, 68 B, 310/68 R; 361/203, 206, 210; 318/648, 649, 807, 809, 607, 632

[56] References Cited

U.S. PATENT DOCUMENTS

| | | | |
|---|---|---|---|
| 4,245,869 | 1/1981 | Scheffer et al. | 310/90.5 |
| 4,585,282 | 4/1986 | Bosley | 310/90.5 |
| 4,697,128 | 9/1987 | Matsushita et al. | 318/607 |
| 4,841,212 | 6/1989 | Matsushita et al. | 318/607 |
| 5,053,662 | 10/1991 | Richter | 310/90.5 |
| 5,126,610 | 6/1992 | Fremerey | 310/90.5 |

FOREIGN PATENT DOCUMENTS

| | | | |
|---|---|---|---|
| 2322294 | 3/1977 | France | 310/90.5 |
| 2444099 | 8/1978 | Germany | 310/90.5 |
| 3120691 | 12/1982 | Germany | 310/90.5 |
| 4210741 | 10/1993 | Germany | 310/90.5 |
| 2184205 | 7/1990 | Japan | 310/90.5 |
| 1549324 | 7/1979 | United Kingdom | 310/90.5 |

OTHER PUBLICATIONS

Magnetic Bearings, G. Schweitaer (editor), Proceedings of the First Int'L Symposium ETH Zurich, Switz., Jun. 6–8, 1988.

*Primary Examiner*—Steven L. Stephan
*Assistant Examiner*—Michael Wallace, Jr.
*Attorney, Agent, or Firm*—Frishauf, Holtz, Goodman, Langer & Chick, P.C.

[57] ABSTRACT

In order to stabilize a body born contactlessly in the magnetic field of a stator, there is a magnetic bearing regulator which influences the magnetic field between magnetizable components in the stator and magnetizable components of the body. The bearing unit consists of at least two electric coils connected in series which, as a pair of coils, act as both a position sensor and an electromagnetic adjuster. In order to attain great reliability with a simple and economical construction, the two outer ends of the pair of coils (2,3) are each connected to an output of an amplifier (4,5) and one of the two amplifiers (5) supplies the inverted output signal of the other (4). A high-frequency signal is applied to the inputs of both amplifiers (4,5) by an oscillator (7) which feeds into the pair of coils (2,3) via the amplifiers (4,5) and received between the two coils via a high pass filter (12) by a phase-sensitive rectifier (8) which is in synchronism with the high-frequency signal from the oscillator (7). The output of the rectifier (8) is connected to the amplifiers (4,5) via a downstream regulating network (9).

16 Claims, 3 Drawing Sheets

MAGNETIC BEARING CONTROL SYSTEM

The invention concerns a magnetic bearing control system for the stable support of an object mounted without contact in the magnetic field of a stator, whereby magnetizable components in the stator cooperate with magnetizable components of the object. At least two electrical coils connected in series serve as the bearing element, and this pair of coils operates simultaneously as a position sensor and as an electromagnetic positioning unit, whereby the magnetic field of the stator operating on the object and designated as biasing runs parallel to the direction of magnetizing of the coils.

Magnetic bearings for support of objects without contact are described, for example, in G. Schweitzer (Editor), "Magnetic Bearings", Proceedings of the First Int. Symp. ETH-Zurich, Switzerland, 1988. For rotor shafts, however, magnetic bearings are also known for measurement objects suspended in the magnetic field from DE Patent 2,444,099 and DE Patent 3,808,331. The magnetic bearings have permanent magnets, in the magnetic field of which, the object to be supported, which on its side has magnetic or magnetizable components, is introduced. Electrical control systems, the output signals of which vary the magnetic fields produced by the electrical coils, serve for stabilizing the mounting. The prevailing magnetic field intensity corresponding to the output signal of a position sensor between the magnetizable magnetic bearing components is influenced by the control system, and this sensor measures the existing distance between the object supported without contact and the magnetic stator.

An electromagnetic bearing element for two degrees of freedom with respect to the motion of the supported rotor with pairs of coils connected in series is known from DE OS 2,537,597, and these pairs of coils serve as a position sensor as well as an electrical positioning unit. In this arrangement, all individual coils are placed on a common core, and are thus magnetically coupled. With such a bearing element, there are considerable electromagnetic influences of the sensor currents due to the bearing fluxes, and vice versa, and this occurs in both degrees of freedom. These undesired influences can be reduced only by considerable expenditure with respect to circuits, such as multiple arrangements of coils for each degree of freedom, by dividing the coils, or by taps and a corresponding electrical circuitry.

A high-frequency measurement bridge circuit is described in a patent application P 42 10 741.5 (PT 1.1126), which has not been prepublished, for reduction of magnetic bearing components, in which electrical coils serve in the same way as in the case of DE OS 2,537,597 for control of the central position of the object that is supported without contact simultaneously as a position sensor and as an electromagnetic positioning component for a permanent magnetic bearing.

The object of the invention is to create a control system for a magmatic bearing with a small number of control components, which has a high operating reliability with a simple and cost-favorable configuration.

This object is attained for a magnetic bearing control system of the type named initially according to the invention, that the pair of coils are connected in series electrically, but the coils are arranged magnetically in opposite positions, and with both of their outer ends combined with an output of an amplifier, whereby one of the two amplifiers supplies the inverted output signal of the other amplifier. In the known way, a high-frequency signal of an oscillator, particularly a sinusoidal high-frequency signal is applied to the input of the amplifier, and this signal feeds into the pair of coils via the two amplifiers and is read off between the two coils via a high-pass filter by a phase-sensitive rectifier (synchronous rectifier), which is timed with the high-frequency signal of the oscillator. The phase-sensitive rectifier is turned on at the electrical "central point" between the two coils, whereby the two inverted high-frequency signals fed into the coils at this point add up to zero for the same coil inductance. However, if the object supported in the magnetic field shifts between the pair of coils, then the latter effects a change in inductance in the pair of coils and thus there is a potential shift according to the change in voltage at the pregiven central point between the coils. The pair of coils operates in this way as a position sensor. The potential shift is converted to a path-proportional control signal with a pole direction corresponding to the direction of the motion of the object in the phase-sensitive rectifier. The control signal is introduced into the amplifiers via the control network, and these amplifiers in turn now load the pair of coils as an electromagnetic positioning component and thus close the control system circuit. The output current of the two amplifiers flowing through the pair of coils produces a magnetic-field change dependent on the respective position of the object to be supported, whereby the magnetic field is aligned in such a way that the object is stabilized in its preset position. In the pair of coils, the high-frequency signal for the positional sensing is superimposed on the constant current proportional to the path and direction, which operates as the positioning signal.

Inverting amplifiers are appropriately used as amplifiers, whereby the input from one of the two amplifiers is joined with the output of the other amplifier. In order to separate the low-frequency positioning signal from the high-frequency sensing signal, a low-pass filter is intermediately connected between the output of the phase-sensitive rectifier and the input of the control system network.

Another pair of coils is added to the first pair of coils described above in order to stabilize a magnetically mounted object in several degrees of freedom of its motion, whereby a control circuit with a circuit arrangement of the type described above is used for each pair of coils and a high-frequency oscillator can be used commonly for all control circuits.

According to one aspect of the invention, there are two pairs of coils for the radial mounting of a rotor; these pairs of coils are magnetically decoupled and the coils are each arranged in a radial plane with a distance from the object on the opposite sides of the object, and are connected with each other by a 90° displacement with respect to each other, in such a way that each pair of coils operates in its property as a position sensor for producing the positioning signal for the other pair of coils which operates in its property as the positioning member.

The invention is explained in more detail below on the basis of examples of embodiment. Individually, the drawing shows:

Figure 1:
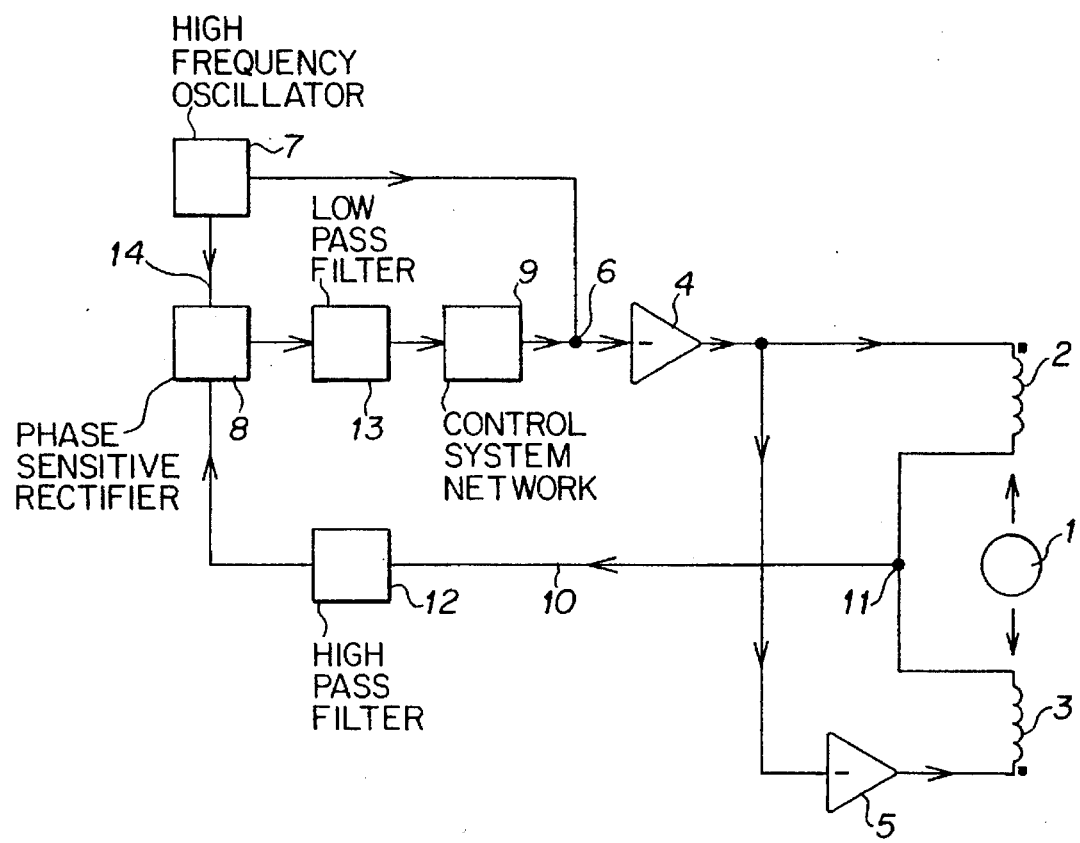
FIG. 1 shows a magnetic bearing control system for a magnetically mounted object with a pair of coils with coils arranged radially in the magnetic field.

A magnetic bearing control system for a magnetically mounted object 1 is shown in FIG. 1. The object is mounted without contact inside a magnetic field of a stator having magnetizable components. The magnetic-field direction of the magnetic field, the so-called biasing MV, is given in FIG. 3. The stator with its magnetizable components producing the magnetic field as well as the magnetizable components of object 1 are not shown in the drawing. All of the components of the magnetic bearing control system are shown.

Two coils 2, 3, which are arranged in a radial plane around object 1 in the axial direction and on opposite sides of the object serve for influencing the magnetic field strengths of the magnetic field. Coils 2, 3 are connected in series as a pair of coils and are connected at the outputs of two amplifiers 4, 5 by their outer ends, which are on the initial part of the coil in the example of embodiment (the initial part of the coil is shown in the drawing by a filled-in square), whereby inverting amplifiers are utilized for both amplifiers in the example of embodiment. The two amplifiers 4, 5 are connected one behind the other, so that amplifier 5 supplies the inverted output signal of amplifier 4.

Figure 3:
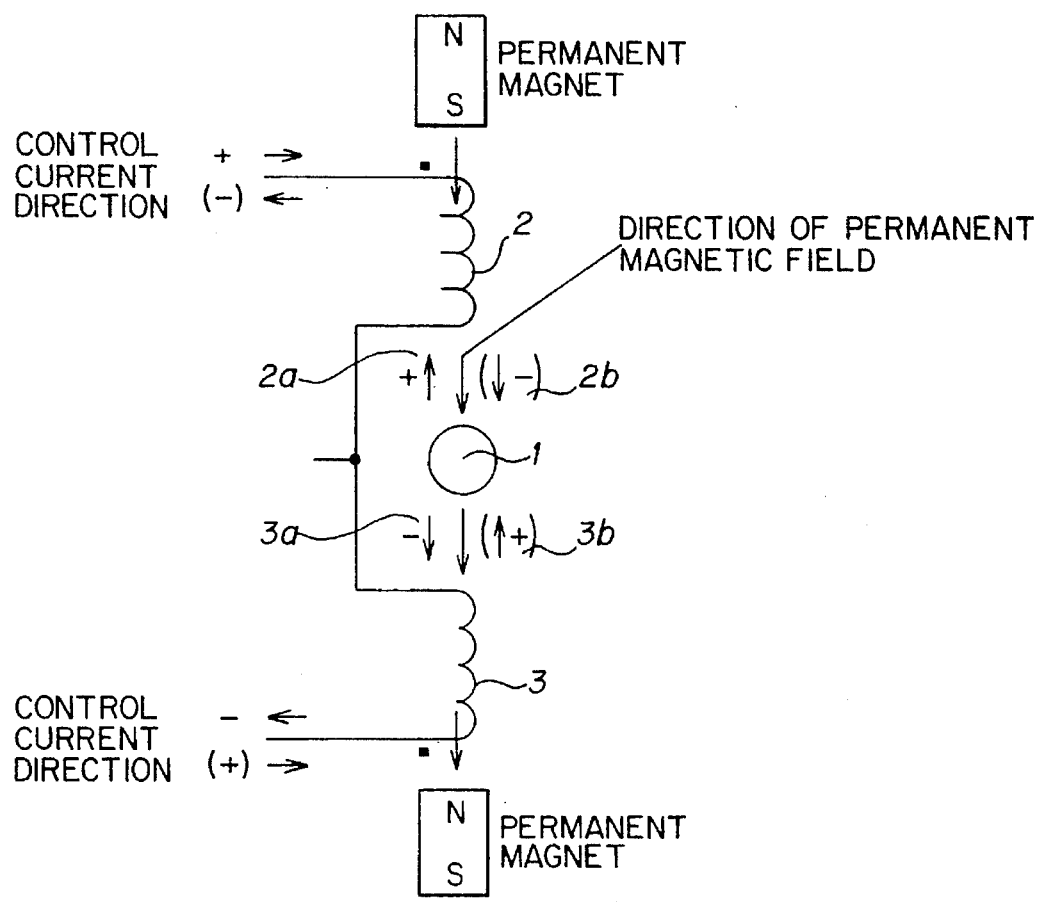
FIG. 3 shows the effect of a positive or negative control current on the permanent magnetic biasing.

Constant current proportional to path and direction flows through the pair of coils as the electromagnetic positioning member, and the magnetic-field direction produced by the coils is shown in FIG. 3 by arrows 2a, 3a or in the reversed control current direction by arrows 2b, 3b. Coils 2, 3 are thus arranged electrically in series, but are aligned in opposite directions magnetically, whereby the magnetic-field directions of the coils in the two control current directions run parallel to the bias MV.

Coil pair 2, 3 is simultaneously loaded as a sensor coil pair with high-frequency sensing voltage. For this purpose, a high-frequency oscillator 7 as well as a control system network 9 subsequently connected to a phase-sensitive rectifier 8 are connected at the input of the amplifier 4. The input of rectifier 8 is joined via an electrical line 10 with a measuring point 11, the electrical "central point" between the two coils 2, 3. There is a high-pass filter 12 found in front of the input to rectifier 8, in order to obtain at the rectifier input a clear high-frequency difference signal for the position of the object supported in the magnetic field.

In the example of embodiment, a low-pass filter 13 for smoothing the position-proportional control signal is used between phase-sensitive rectifier 8 and control system network 9, and this signal serves via coils 2, 3 for the electromagnetic stabilizing of the preset position of object 1. In order to determine the direction of deviation of the suspended object from its preset position, the phase-sensitive rectifier 8 is cycled by high-frequency oscillator 7. For this, the output of oscillator 7 in addition to its connection to input 6 of amplifier 4 is connected via a line 14 in parallel also with phase-sensitive rectifier 8.

The control signal produced by phase-sensitive rectifier 8 for control of the preset position of the object depends on the difference in the coil impedances of coils 2, 3 that vary upon motion of the object in the magnetic field. The coil impedances vary analogously to the position of object 1 suspended in the magnetic bearing. With a deviation from the preset position, an electrical signal proportional to the deviation is formed between coils 2, 3 at measurement point 11, and this signal is processed after suppression of low-frequency signal components by its high-pass filter 12 in rectifier 8 by means of the connected high-frequency signal of oscillator 7 such that the amount and direction of the deviation from the preset position are detected. A corresponding output signal of rectifier 8, after passage through low-pass filter 13, is then sent to control system network 9, which finally controls amplifier 4 such that its output current as well as the output current of amplifier 5 change the magnetic field between object 1 and stator via coils 2, 3 such that object 1 is returned to its preset position.

In the preset position of the object, the inverted high-frequency signals for the same coil inductances add up to zero at measurement point 11. With a change in position from this preset position, object 1—as has already been indicated above—effects a change in inductance in the pair of coils and thus a shift in potential according to the change in voltage at measurement point 11, which is converted by rectifier 8 into a voltage signal proportional to the path and with a polarity corresponding to the direction of motion. This signal is introduced via low-pass filter 13 with subsequent control system network 9 again into amplifier 4, so that the control circuit is closed. The output current of amplifiers 4, 5 flowing through the pair of coils 2, 3 produces a magnetic field dependent on the respective position of the object to be supported, and this magnetic field is influenced such that the position of object 1 is stabilized in its preset position, whereby the high-frequency signal for the position sensing remains superimposed on the constant current proportional to the path and direction, i.e., the positioning factor.

A sinusoidal high-frequency signal is preferably produced by oscillator 7 as a high-frequency signal. Control system network 9 appropriately has a PD characteristic.

The described circuit arrangement is also suitable for multiaxial bearing stabilization of magnetically mounted objects. A separate magnetic bearing control system with a pair of coils and appropriate biasing is necessary then for each degree of freedom of motion, whereby it is possible to use only a single high-frequency oscillator for generating the sensing voltage for all magnetic bearing control systems.

Figure 2:
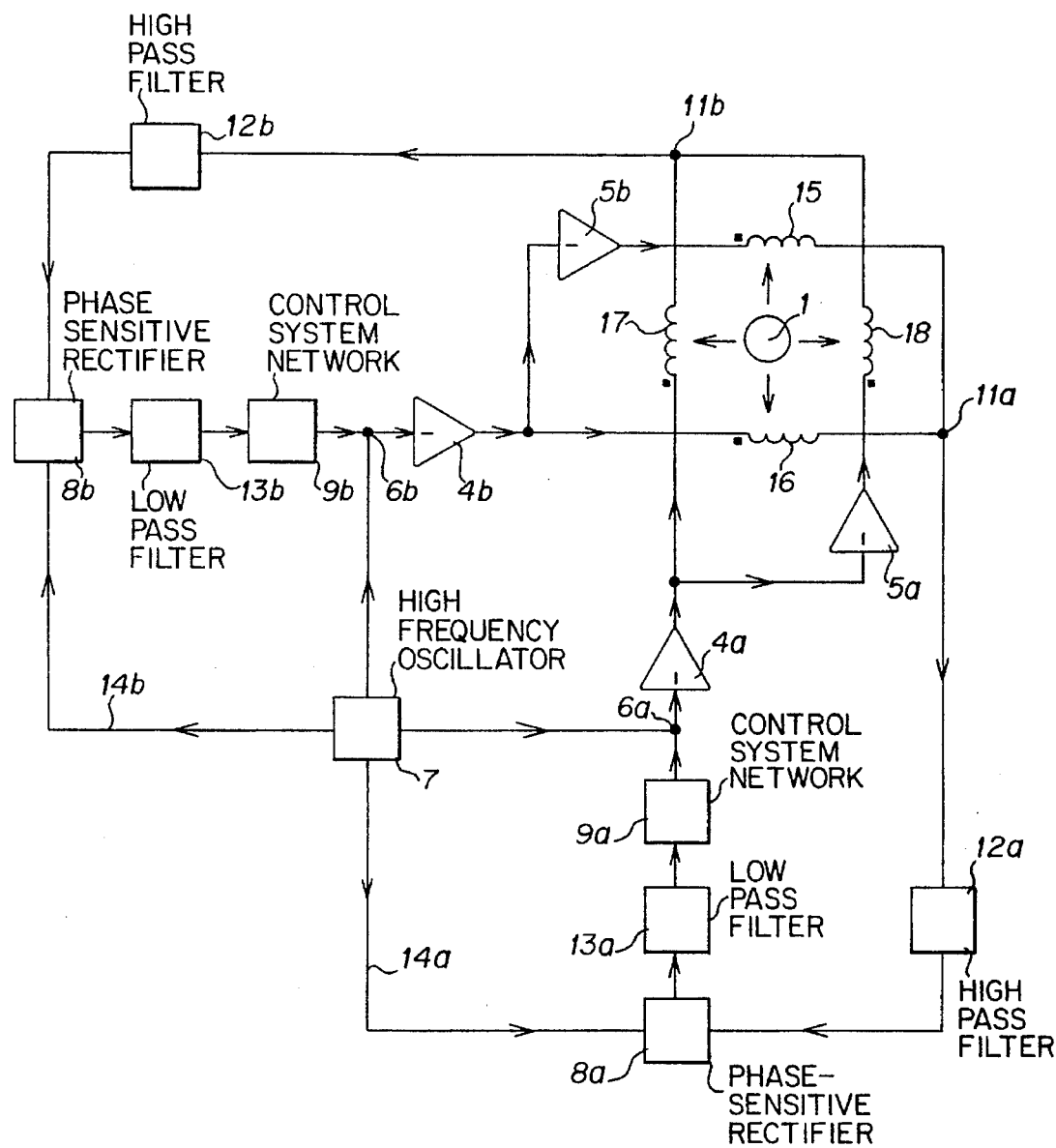
FIG. 2 shows a magnetic bearing control system with two pairs of coils with coils arranged in a radial plane around the object.

Another application of the magnetic bearing control system according to the invention is given in FIG. 2. This deals with a two-axis magnetic bearing control, which is used preferably for control of magnetic radial bearings. In the magnetic bearing control system according to FIG. 2, coil pairs 15, 16 and 17, 18 are each arranged displaced from each other by 90°; these enclose object 1 to be mounted in the magnetic field at a distance to the object and in a radial plane concentric to its axis of rotation (in the example of embodiment according to FIG. 1, coils 2, 3—as already mentioned—are aligned radially to the axis of rotation.) Coils 15, 16 and 17, 18 are magnetically decoupled (e.g., they have no common coil core) and they are connected in circuit in the same way as in FIG. 1 as a pair of coils in series. The two magnetic bearing control systems a and b belonging to them have the same electrical components as the magnetic bearing control system according to FIG. 1. The components in FIG. 2 are thus provided with the same reference numbers as the corresponding components according to FIG. 1, with the letters "a" and "b" added to them in order to differentiate them, for characterizing the components in each of the magnetic bearing control systems.

The pairs of coils are joined together in the example of embodiment according to FIG. 2 by means of both magnetic bearing control systems such that each pair of coils operates in one coordinate as the positioning member, and operates as the sensor in the other coordinate. For this purpose, the sensor signal of one of the pair of coils is used as the positioning signal of the other pair of coils and vice versa; coils 15, 16 thus operate as sensors for coils 17, 18 stabilizing the position of the object as the positioning components, whereas coils 17, 18 are decisive as sensors for the position signals introduced to coils 15, 16 as the positioning component. Correspondingly, at measurement point 11a between coils 15, 16, the high-pass filter 12a is preconnected to the phase-sensitive rectifier 8a, and the output of rectifier 8a leads via low-pass filter 13a and control system network 9a to the input 6a of amplifier 4a, the output of which is joined in parallel on the one hand with coil 17, and on the other hand with the input of inverting amplifier 5a, which supplies the signal for coil 18. The magnetic bearing control system b is applied at measurement point 11b between coils 17, 18. It is equipped in the same way as magnetic bearing control system 17a with high-pass filter 12b, phase-sensitive rectifier 8b, low-pass filter 13b, control system network 9b, and amplifiers 4b, 5b, whereby the outputs of amplifiers 4b, 5b, now lead to coils 15, 16, and magnetic bearing control systems a, b thus are joined together for a closed current circuit. In the example of embodiment, both magnetic bearing control systems are appropriately supplied by the same high-frequency oscillator 7. The output of the high-frequency oscillator is connected for this purpose in parallel to both the inputs 6a, 6b of amplifier 4a, 4b, as well as connected to both rectifiers 8a, 8b via line segments 14a, 14b for cycling the phase-sensitive rectifiers.

This circuit arrangement according to FIG. 2 may preferably be used for mounting cylindrical objects, for example, in two radial support planes. Of course, this magnetic bearing control system as a positional stabilization of a magnetically supported object in two of its degrees of freedom of motion can also be combined, for example, with a magnetic bearing control system according to FIG. 1 for positional stabilization of the object also in a third degree of freedom of motion. In combination with the circuit arrangement according to FIG. 1, an active 3-axial magnetic bearing is therefore obtained. Only one high-frequency oscillator is necessary, which commonly loads all the magnetic bearing control systems, for such a combination of a magnetic bearing control system.

For the components of the described magnetic bearing control system, commercial integrated circuits may be used, e.g., output amplifiers for controlling coils, such as are used in radio apparatuses, e.g., auto radios. LVDT signal processing units are suitable for signal processing, i.e. circuits for controlling linearly variable differential transformers. These transformers are also known as inductive position transducers, which essentially contain an integrated sinusoidal oscillator and a synchronous rectifier/demodulator.

FIG. 3 shows how, in combination with two permanent magnets, which serve for biasing, a positive control current for the pregiven coil arrangement effects an attenuation of the permanent magnetic field in the region of coil 2 with simultaneous intensification of the permanent magnetic-field in the region of coil 3 (arrows 2a, 3a, for the magnetic field direction produced by the coils). A negative control current, with current direction signs given in parentheses in FIG. 3, on the other hand, effects an intensification of the permanent magnetic field in the region of coil 2 with a simultaneous attenuation of the permanent magnetic-field in the region of coil 3 (arrows 2b, 3b for the magnetic field direction produced by the coils).

We claim:

1. A magnetic bearing control system for stably mounting an object without contact at a preset position in a magnetic field of a stator, with magnetizable components of the stator cooperating with magnetizable components of the object, said system comprising:

a pair of coils each having a joined end and a separate end, said pair of coils being arranged to be both a position sensor and an electromagnetic positioning component for one degree of freedom, wherein a magnetic field of the stator designated as biasing runs parallel to a magnetizing direction of the coils, the coils in said pair of coils being connected electrically in series with each other at the respective joined ends and poled magnetically in opposite directions to each other, and with the outer separate ends of said coils being respectively connected to outputs of a pair of amplifiers, wherein said amplifiers supply respective output signals which are inverted relative to each other;

a high-frequency signal oscillator providing an output signal coupled to an input of said pair of amplifiers;

a first phase-sensitive rectifier coupled via a high-pass filter to a measuring point at the joined ends of the two coils of said pair of coils, said rectifier being cycled with the output signal of said oscillator; and a control system network having an input coupled to the output of said rectifier for providing a control signal to maintain the object at the preset position.

2. The magnetic bearing control system according to claim 1, wherein an output of one of said pair of amplifiers is coupled to an input of the other amplifier.

3. The magnetic bearing control system according to claim 2, wherein the output signal of said oscillator is coupled to an input of said one of said pair of amplifiers.

4. The magnetic bearing control system according to claim 3, wherein the control signal from said control system network is coupled to the input of said one of said pair of amplifiers.

5. The magnetic bearing control system according to claim 4, wherein said pair of amplifiers are inverting amplifiers.

6. The magnetic bearing control system according to claim 5, further comprising a low pass filter coupled between the output of said rectifier and the input of said first control system network.

7. The magnetic bearing control system according to claim 1, wherein said pair of amplifiers are inverting amplifiers.

8. The magnetic bearing control system according to claim 1, further comprising a low pass filter coupled between the output of said rectifier and the input of said first control system network.

9. A magnetic bearing control system for stably mounting an object without contact at a preset position in a magnetic field of a stator, with magnetizable components of the stator cooperating with magnetizable components of the object, said system comprising:

a first pair of coils each having a joined end and a separate end, said first pair of coils being arranged to be both a position sensor and an electromagnetic positioning component, the coils in said first pair of coils being connected electrically in series with each other at the respective joined ends thereof and poled magnetically in opposite directions to each other, and with the outer separate ends of said coils being respectively connected to outputs of a first pair of amplifiers, wherein said amplifiers supply respective output signals which are inverted relative to each other;

a second pair of coils each having a joined end and a separate end, said second pair of coils being arranged to be both a position sensor and an electromagnetic positioning component, the coils in said second pair of coils being connected electrically in series with each other at the respective joined ends thereof and poled magnetically in opposite directions to each other, and with the outer separate ends of said coils being respectively connected to outputs of a second pair of amplifiers, wherein said second pair of amplifiers supply output signals which are respectively inverted relative to each other;

a high-frequency signal oscillator providing an output signal coupled to an input of said first pair of amplifiers and an input of said second pair of amplifiers;

a first phase-sensitive rectifier coupled via a first high-pass filter to a first measuring point at the joined ends of the two coils of said second pair of coils, said first rectifier being cycled with the output signal of said oscillator;

a first control system network having an input coupled to the output of said first rectifier for providing a control signal to said first pair of amplifiers to maintain the object at the preset position in one degree of freedom;

a second phase-sensitive rectifier coupled via a second high-pass filter to a second measuring point at the joined ends of the two coils of said first pair of coils, said second rectifier being cycled with the output of said oscillator; and a second control system network having an input coupled to the output of said second rectifier for providing a control signal to said second pair of amplifiers to maintain the object at the preset position in another degree of freedom.

10. The magnetic bearing control system according to claim 9, wherein said second pair of coils are magnetically decoupled from said first pair of coils, said first and second pairs of coils being arranged in a radial plane of the object, said first pair of coils being displaced by 90° with respect to said second pair of coils.

11. The magnetic bearing control system according to claim 10, wherein said first pair of coils operates as the position sensor for said other degree of freedom while said second pair of coils operates as the electromagnetic positioning component in said other degree of freedom, and wherein said second pair of coils operates as the position sensor for said one degree of freedom while said first pair of coils operates as the electromagnetic positioning component in said one degree of freedom.

12. The magnetic bearing control system according to claim 9, wherein an output of one of said first pair of amplifiers is coupled to an input of the other of said first pair of amplifiers, and wherein an output of one of said second pair of amplifiers is coupled to an input of the other of said second pair of amplifiers.

13. The magnetic bearing control system according to claim 12, wherein the output signal of said oscillator is coupled to an input of said one of each of said first and second pairs of amplifiers.

14. The magnetic bearing control system according to claim 13, wherein the control signals from said first and second control system networks are respectively coupled to the inputs of said one of said first and second pairs of amplifiers.

15. The magnetic bearing control system according to claim 9, wherein said first and second pairs of amplifiers are inverting amplifiers.

16. The magnetic bearing control system according to claim 9, further comprising a low pass filter coupled between the output of said first rectifier and the input of said first control system network, and another low pass filter coupled between the output of said second rectifier and the input of said second control system network.

* * * * *